United States Patent [19]

Buckminster et al.

[11] 4,385,701
[45] May 31, 1983

[54] ARTICLE ELEVATING APPARATUS WITH INCLINED ROLLER CARRIERS

[75] Inventors: William F. Buckminster, Voorhees; William J. Covert, Berlin; Wilson Y. Conyngham, Clayton, all of N.J.

[73] Assignee: Garvey Corporation, Blue Anchor, N.J.

[21] Appl. No.: 263,914

[22] Filed: May 15, 1981

[51] Int. Cl.³ .............................................. B07C 5/34
[52] U.S. Cl. .................................... 209/598; 209/644; 209/911; 209/924; 198/796; 198/801
[58] Field of Search ............... 209/598, 552, 577, 644, 209/911, 924; 198/796, 801; 53/53

[56] References Cited

U.S. PATENT DOCUMENTS

| 1,744,650 | 1/1930 | Leonard | 198/801 X |
| 2,790,567 | 4/1957 | Rockhill | 198/796 X |
| 3,197,045 | 7/1965 | Nevo-Hacohen | 414/248 |
| 3,371,769 | 3/1968 | Beninger | 198/801 |
| 3,499,555 | 3/1970 | Wahle | 198/347 |
| 4,011,155 | 3/1977 | Feurstein | 209/598 |

Primary Examiner—Allen N. Knowles
Attorney, Agent, or Firm—Anthony A. O'Brien

[57] ABSTRACT

In an article elevating apparatus, articles such as cigarette cartons, are picked up at a loading station by inclined roller carriers moving in an upward vertical direction. During upward movement the articles are held on the roller carriers by sliding engagement of the downward end of the articles against a vertical rail. The articles roll off of the carriers at a discharge station defined by the upper end of the rail.

9 Claims, 12 Drawing Figures

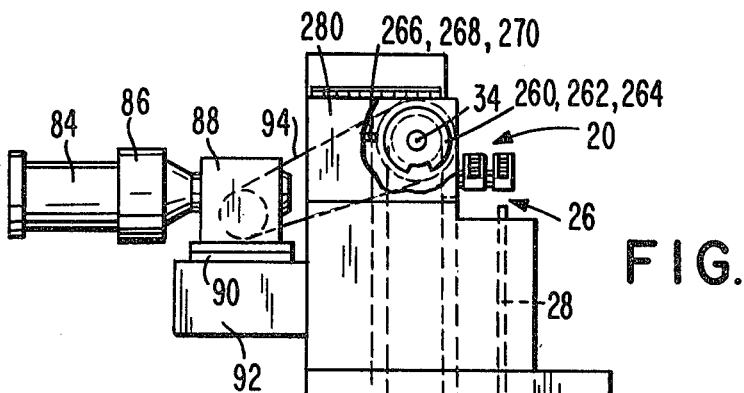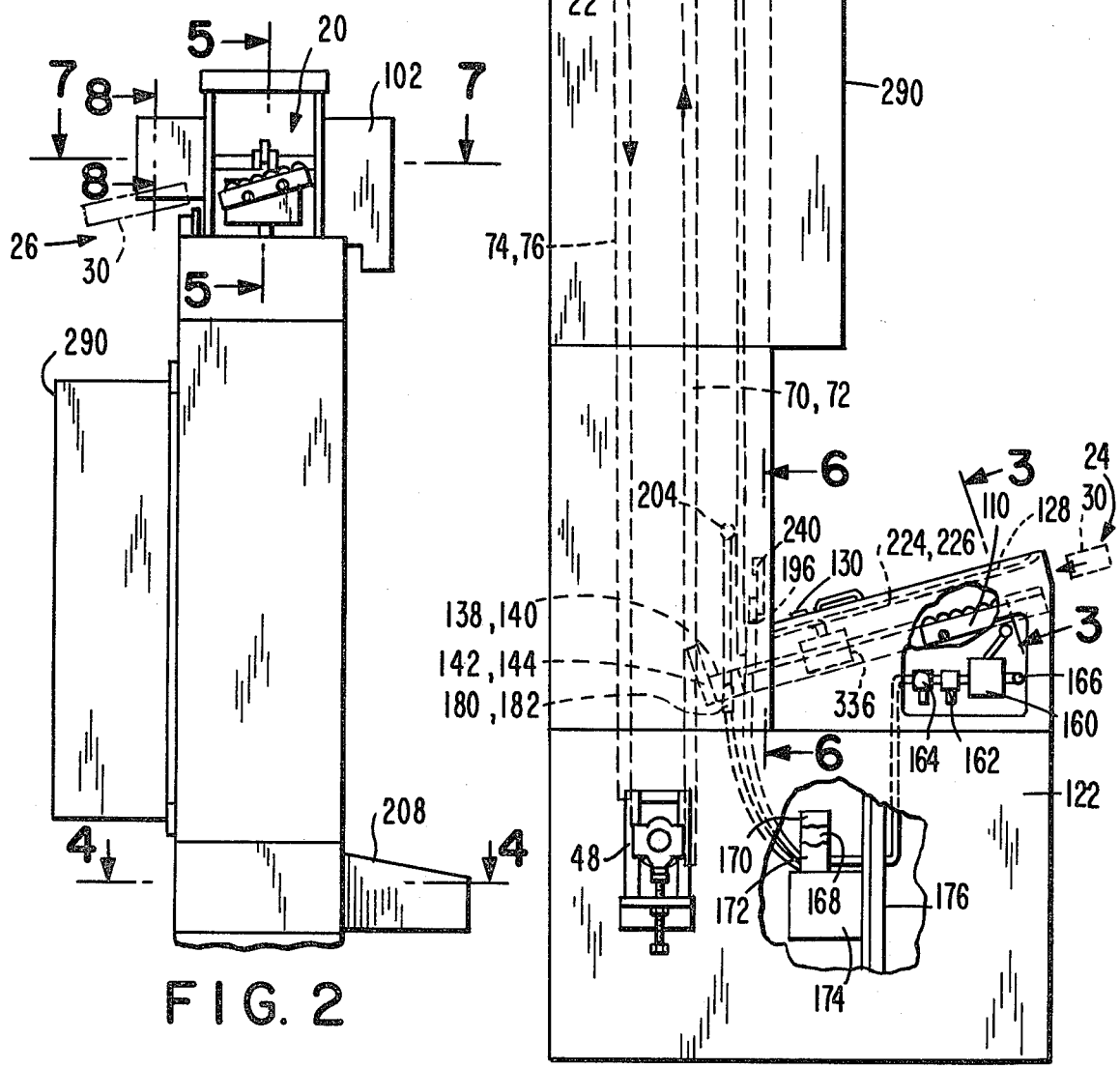

FIG. 8
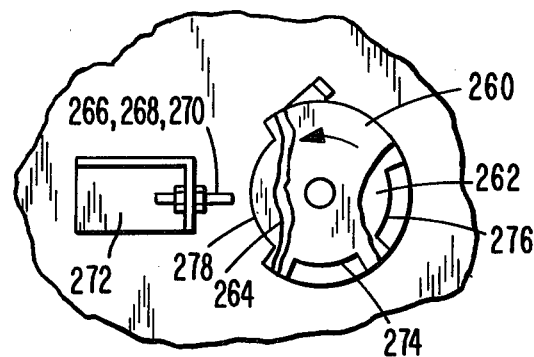
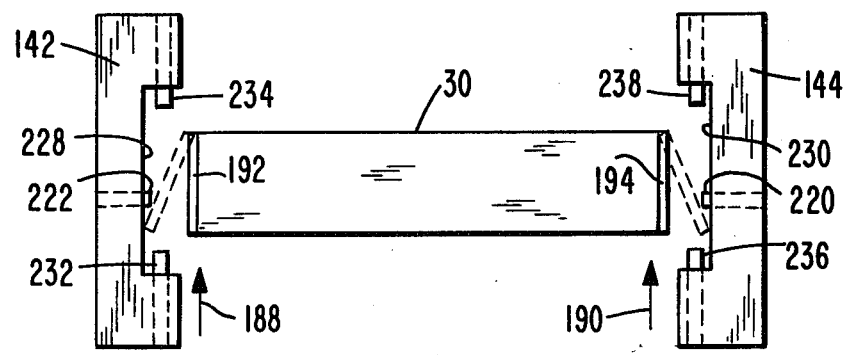
FIG. 9
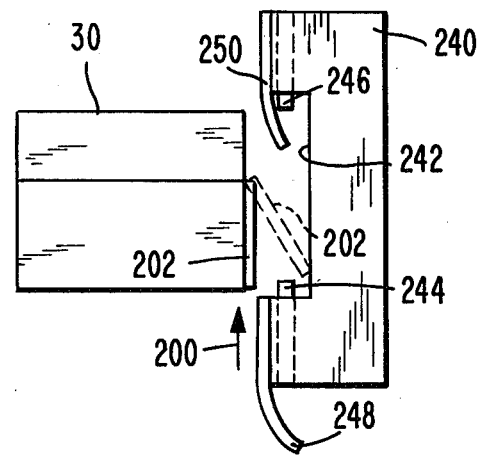
FIG. 10

ARTICLE ELEVATING APPARATUS WITH INCLINED ROLLER CARRIERS

BACKGROUND ART

1. Field of the Invention

The present invention relates to vertical elevating apparatus for loading articles at one level, transferring the articles to a second level, and then discharging the articles at the second level.

2. Brief Description of the Prior Art

The prior art as exemplified in U.S. Pat. No. 3,197,045 and No. 3,499,555 contains a number of conveying apparatus wherein article carriers are mounted on endless chains which are moved in a path including a vertical portion for elevating articles from one level to another level. Generally, the prior art elevating apparatus requires powered discharge mechanisms for removing the articles from the article carriers at the second level.

One prior art cigarette carton elevating apparatus has a horizontal input conveyor section along which is mounted apparatus for detecting unglued side and front flaps on cigarette cartons or the like. Jets of air are directed on the opposite sides and the front side of the carton to open any unglued flap. An open unglued flap is detected by the interruption of a light beam from a light source to a light detector, the light source and light detector being mounted on the opposite upper and lower sides of the article testing station.

SUMMARY OF THE INVENTION

The invention is summarized in a article elevating apparatus including a plurality of roller carrier sections, means for moving the plurality of roller carrier sections sequentially in an endless path including a vertical path portion, the moving means including means for holding the roller carrier sections at an incline relative to the horizontal in the vertical path portion, means at one end of the vertical path portion for feeding articles sequentially to the roller carrier sections, a guide rail extending vertically alongside the vertical path portion on the downward side of the roller carrier sections for maintaining the articles on the roller carrier sections while moving in the vertical path portion, and the guide rail having a termination point at the opposite end of the vertical path portion so as to define a gravity discharge station for articles carried by the roller carrier sections.

An object of the invention is to construct an article elevating apparatus which is economical and reliable.

Another object of the invention is to provide a gravity discharge to eliminate the need for power discharge from the elevating apparatus.

One advantage of the invention is that articles carried by inclined roller carriers are automatically discharged by gravity due to the incline of the roller carriers after the carriers pass the termination point of a rail maintaining the articles on the carriers.

Other objects, advantages and features of the invention will be apparent from the following description of the preferred embodiment taken in conjunction with the accompanying drawings.

BRIEF DESCRIPTION OF THE DRAWINGS

FIG. 1 is a side elevational view taken from the left side, with portions broken away, of an article elevating apparatus in accordance with the invention.

FIG. 2 is a front elevational view of a broken away upper portion of the apparatus of FIG. 1.

FIG. 8 is an elevation view of a timing disk assembly broken away from the apparatus of FIG. 1.

FIG. 9 is an inclined view taken from the upper front of an unglued-side-flap detecting mechanism removed from the apparatus of FIG. 1.

FIG. 10 is a side elevational view of a unglued-front-flap detecting mechanism removed from the apparatus of FIG. 1.

DESCRIPTION OF THE PREFERRED EMBODIMENT

Figure 3:
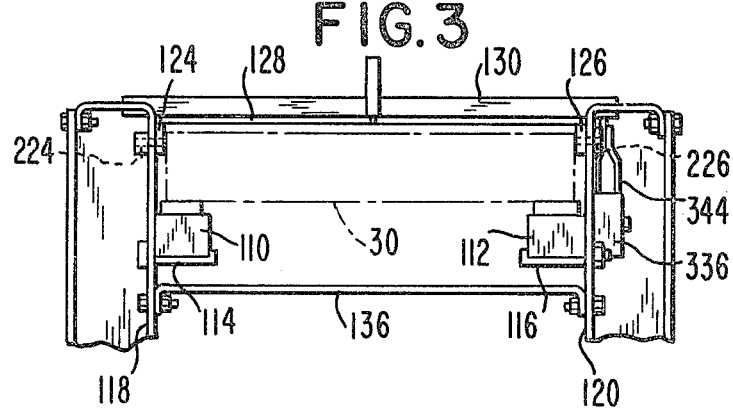
FIG. 3 is a sectional view taken at line 3—3 of FIG. 1 of an infeed for the apparatus.

One embodiment of the invention, as illustrated in FIG. 1, includes a plurality of inclined roller carrier assemblies indicated generally at 20 carried sequentially in spaced relationship on an endless chain 22 which extends along an elongated vertical path from an input station indicated generally at 24 adjacent the lower end of the vertical path to a discharge station indicated generally at 26 adjacent the upper end of the vertical path. A guide rail 28 extends vertically along one side of the upward path of the carriers 20 from the input station 24 to the discharge station 26, the guide rail 28 being on the side of the vertical path along which the downward end of the carriers pass. The incline of the roller carriers 20 is such that articles, for example cigarette cartons 30, individually loaded onto the carriers 20 at the input station 24 are urged by the force of gravity into sliding contact with the rail 28 during the upward movement of the articles until the upper termination point of the rail 28 whereupon the articles 30 are discharged by rolling off of the roller carriers 20 under the force of gravity past the rail 28. The articles 30 are supplied to the input from a conveying mechanism such as a conveying output of a cartoner (not shown) that forms, folds, and glues a carton around a number of plastic film wrapped packs of cigarettes. At the discharge station 26 the articles 30 are discharged onto a conveyor such as an overhead conveying system (not shown) that supplies the infeed to a remotely located case packer for cigarette cartons.

Figure 6:
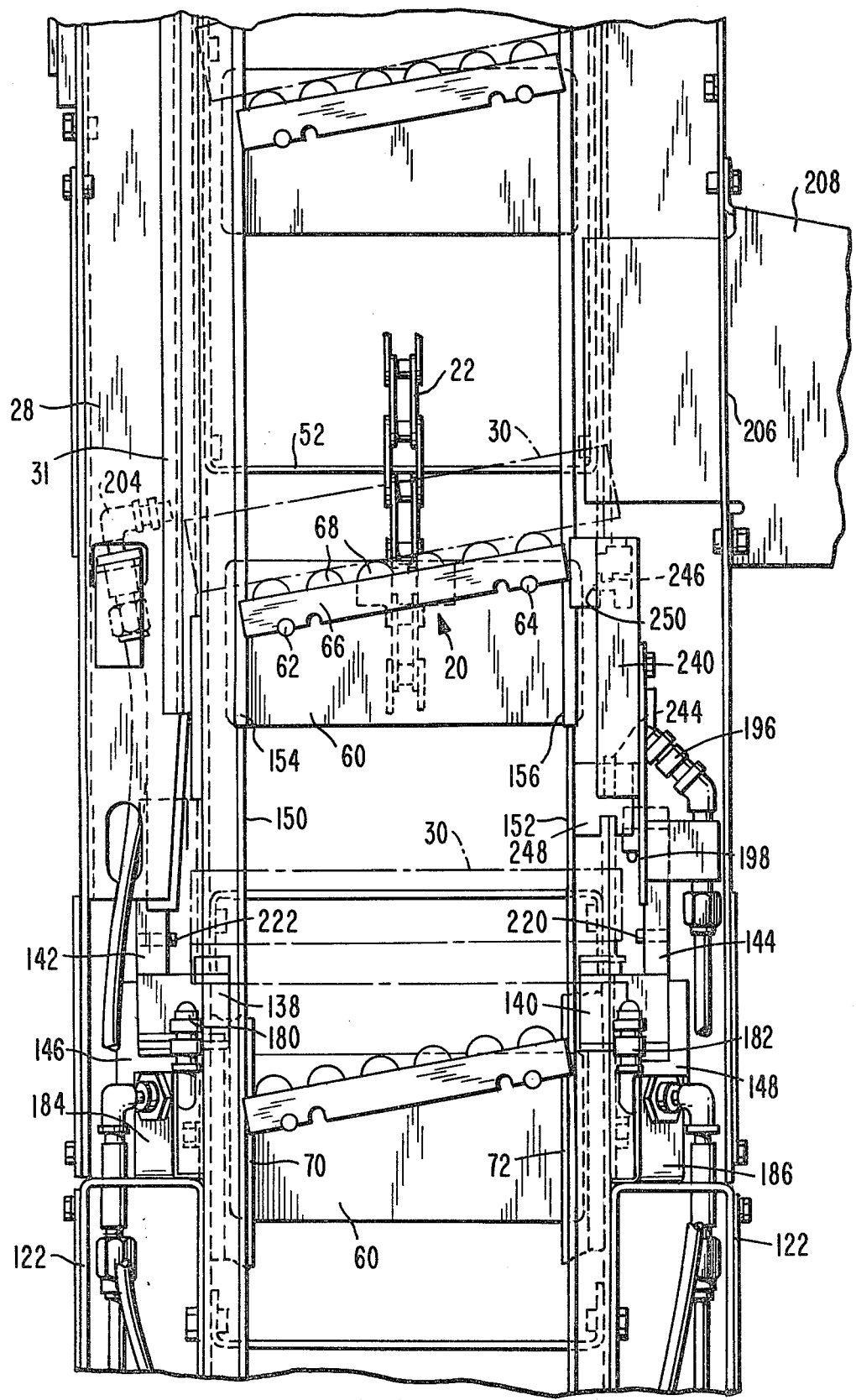
FIG. 6 is a vertical section view taken at line 6—6 of FIG. 1 of a broken away portion of the apparatus.

The rail 28 is mounted on the inside of a vertical frame member 29, shown in FIG. 4, which is mounted on a vertical frame support 40 and which extends along the left front portion of the elevator apparatus from a base frame portion 122, FIG. 1, to just below the discharge station 26. The rail 28 includes a channel strip 31 formed of low-friction material, such as UHMWPE plastic, and secured on the edge of the rail 28 for engaging the articles. As shown in FIG. 6, the lower end of the rail 28 is canted away from the article loading station and has a sliding engagement member 33 secured thereon for engaging and moving the articles 30 slightly to the right as they are picked up and lifted by the carriers 20.

Figure 4:
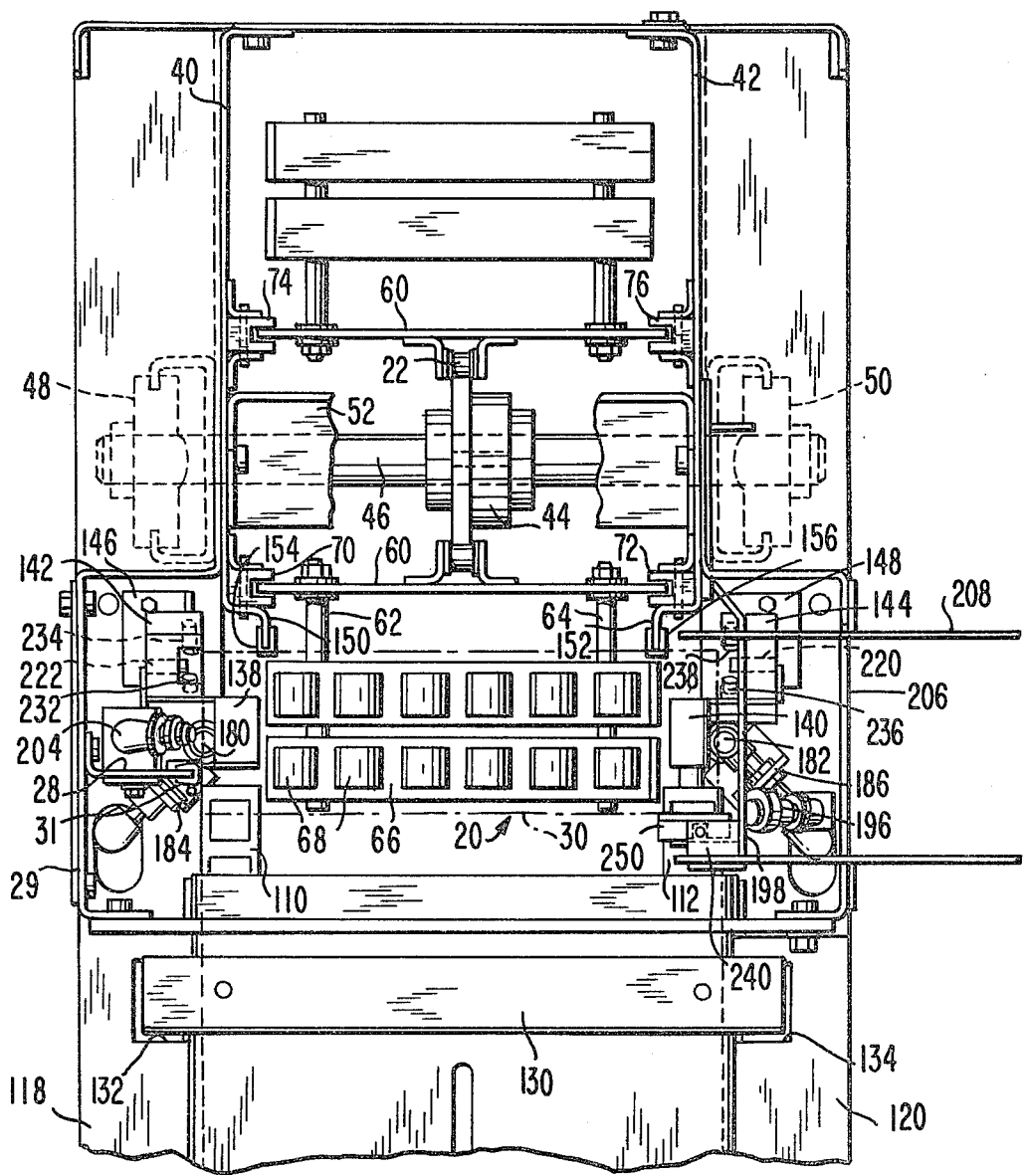
FIG. 4 is a horizontal section view taken at line 4—4 of FIG. 2.
Figure 5:
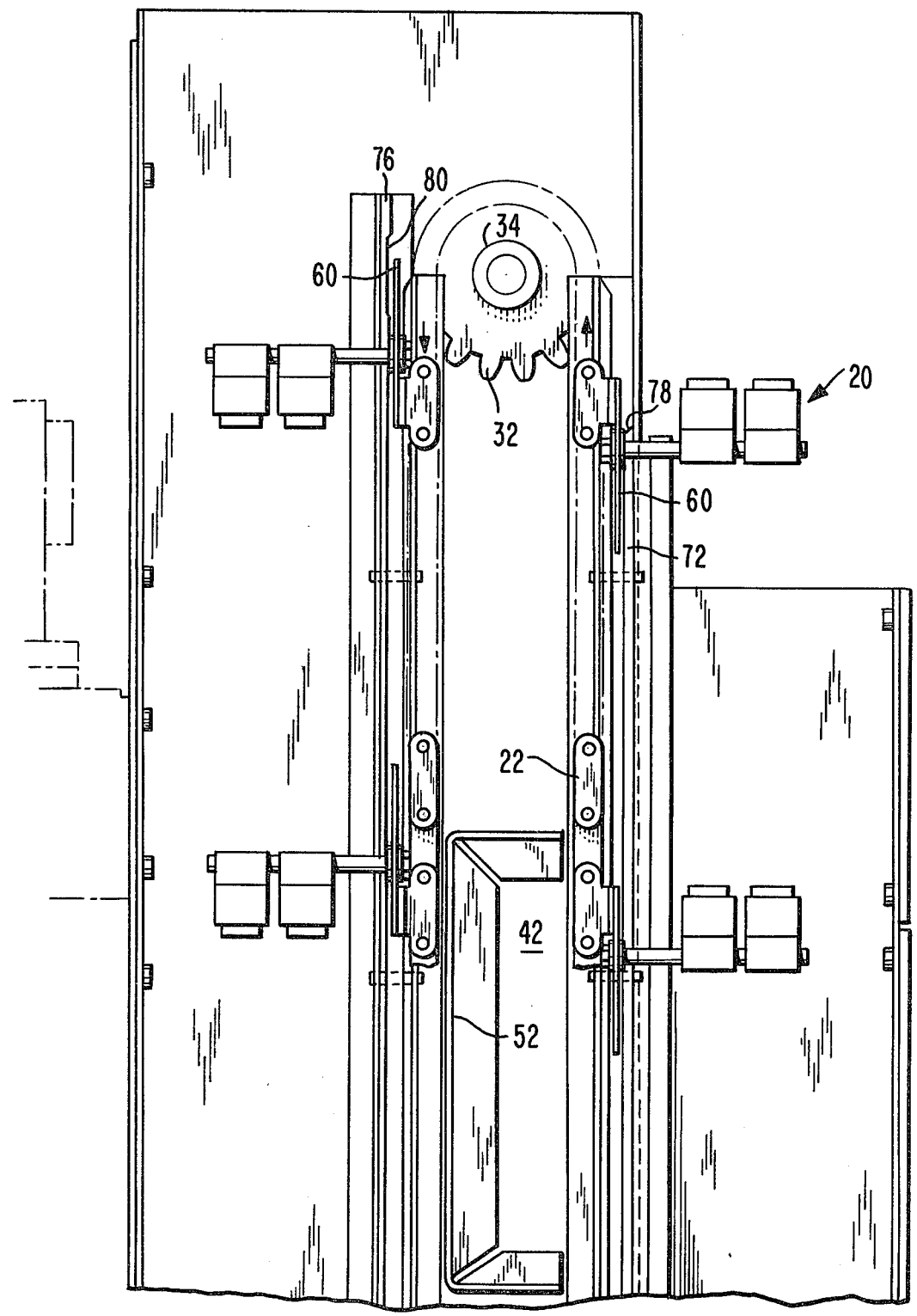
FIG. 5 is an elevational section view taken at line 5—5 of FIG. 2 of a broken away upper portion.
Figure 7:
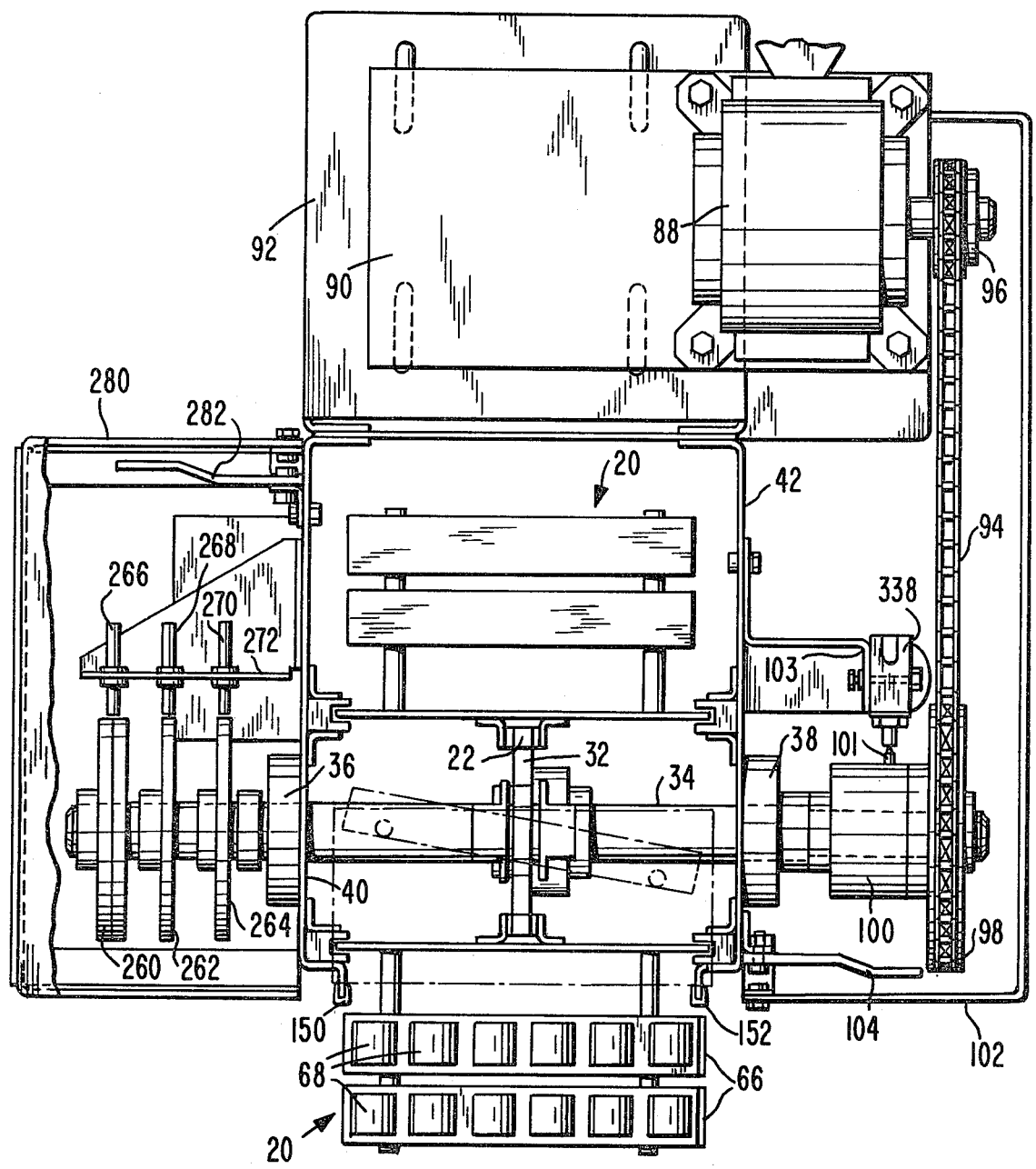
FIG. 7 is a horizontal section view taken at line 7—7 of FIG. 2.

The chain 22 with its carrier assemblies 20, at the upper end of its endless loop, passes over a sprocket 32, FIGS. 5 and 7, which is mounted on a shaft 34 rotatably supported by bearings 36 and 38 mounted on respective vertical frame members 40 and 42. At the lower end, the endless loop of chain 22 passes around a sprocket 44, FIG. 4, which is fixed on a shaft 46 rotatably mounted in adjustable bearing assemblies 48 and 50 secured to the lower portions of the vertical frame members 40 and 42. The bearing assemblies 48 and 50 are adjustable in a vertical direction for adjusting the tension in the chain 22. Horizontal frame members 52, FIGS. 4 and 5, are secured to the inside surfaces of the vertical frame members 40 and 42 generally along the vertical plane defined by the shafts 34 and 46 for determining the spacing between the frame members 40 and 42 and for reinforcing the frame.

Each of the carriers 20 includes a rectangular plate 60, as shown in FIGS. 4, 5 and 6, which extends in a vertical plane with its longer dimension horizontal and with its upper edge at its midpoint secured to a corresponding link of the chain 22 along the upward moving path portion of the chain 22. A pair of supporting pins 62 and 64 are mounted on respective side portions of the rectangular plate 60 and extend horizontally forward from the plate 60; the right pin 64 being mounted higher on the plate than the left pin 62 as viewed in FIG. 6. A pair of conventional roller assemblies, such as plastic roller assemblies each including an elongated support 66 and a plurality of rollers 68 rotatably mounted in the support 66, are secured on the pins 62 and 64, for example, by being snap fit on the pins 62 and 64 at suitable snap fit recesses formed in the bottoms of end portions of the roller carriers 66. The rollers 66 are freely rotatable about horizontal axes which are parallel to the pins 62 and 64, perpendicular to the longitudinal axis of the supports 66, and lie in a plane inclined downwardly to the left as viewed in FIG. 6 to form inclined rolling supporting surfaces on the respective carriers 20 for engaging and supporting the bottom surfaces of the articles 30 so that the force of gravity easily moves the articles down the incline of the supporting surface. Front vertical channel guides 70 and 72 formed from a low friction material such as UHMWPE plastic are mounted on respective forward edges of the inside surfaces of the vertical frame members 40 and 42, and have inward facing channels for slidably engaging and guiding the opposite vertical edges of the rectangular plates 60 during their upward movement. Rear vertical channel guides 74 and 76 are mounted towards the rear of the vertical frame members 40 and 42 for engaging and guiding the vertical edges of the plates 60 during their downward movement. As shown in FIG. 1 the guides 70, 72, 74 and 76 extend substantially the full vertical distance between the upper and lower ends of the endless path through which the carriers 20 travel. As shown in FIG. 5 the front portion of the front guides 70 and 72 (only guide 72 shown in FIG. 5) is cut away at 78 to permit the plate 60 to swing forward during movement of the chain 22 over the sprocket 32. The rear portion of the guides 74 and 76 (only guide 76 shown in FIG. 5) extend upward past the vertical center of the sprocket 32 and have notches 80 formed therein for capturing and directing the plates 60 as they exit from the circular path portion over the top of the sprocket 32. Although not shown in the drawings, the lower rear portion of the guides 74 and 76 are cut away similar to the upper portions of the forward guides 70 and 72 and the bottom forward portions of the guides 70 and 72 extend downward and have plate capturing notches formed therein in a manner similar to the upward extending portions of the guides 74 and 76.

For driving the elevator, an assembly consisting of a motor 84, (FIG. 1), a clutch-brake mechanism 86 and a speed reducer 88 is mounted on a plate 90 adjustably secured to a bracket 92 extending from the upper rear portion of the frame of the elevator. In the clutch-brake mechanism 86, the brake is on the output side of the clutch so as to brake the input to the speed reducer 88 when the clutch is disengaged and the brake is engaged. A chain 94 couples a drive sprocket 96, FIG. 7, on the output shaft of the speed reducer 88 to a sprocket 98 on a torque limiter clutch 100 coupled to the shaft 34. The torque limiter 100 includes an operator 101 for operating a switch 338 mounted by a bracket 103 on the frame member 42 when the torque limiter 100 is tripped. A cover 102 is hingedly mounted on the elevator frame for enclosing the chain 94, sprockets 96 and 98 and torque limitor 100; a pivotable arm 104 is provided for holding the cover 102 in an open position during maintenance of the drive mechanism.

At the input station 24 as shown in FIG. 1 and 3, a pair of rows of roller assemblies 110 and 112, substantially similar to the roller assemblies of the carriers 20, are secured on pins 114 and 116 extending inward from the opposite inner walls of frame members 118 and 120 which are mounted on top of a forward extending portion of the lower horizontal base portion 122 of the elevator frame. The series of roller assemblies 110 and 112 are parallel and lie in a plane inclined downwardly from the front of the input station toward the elevator chain 22 such that cartons 30, fed with their longitudinal dimensions perpendicular to the series of roller assemblies 110 and 112, are moved under the force of gravity toward the rear of the input station. A pair of guide strips 124 and 126 are mounted on the inner walls of the frame members 118 and 120 above the roller assemblies 110 and 112 for retaining the cartons 30 in an input pathway through the input station. A cover 128 is removably positioned on the guide strips 124 and 126 and has a bar 130 mounted toward the rear of the cover transverse to the input direction and extending into notches 132 and 134, FIG. 4, formed in the upper edges of the frame members 118 and 120. A bottom plate 136, FIG. 3, is mounted below the roller assemblies 110 and 112. At the rear of the input station, a pair of carton receiving supports 138 and 140, FIGS. 1 and 4, are mounted on respective sensor support blocks 142 and 144 which in turn are mounted by brackets 146 and 148 on the base portion of the frame. The carton receiving supports 138 and 140 have upper portions which are disposed on opposite sides of the upward path of the roller carrier assemblies 20 and which are aligned with conveying roller surfaces of the roller assemblies 110 and 112 for receiving and supporting the cartons 30 when the cartons pass from the ends of the roller assemblies 110 and 112. Forward portions 150 and 152 of the vertical frame members 140 and 142 define rails for engaging the rear side of the cartons 30 advancing to the rear of the input station as well as extending upward the full length of travel for the cartons 30 to the discharge station 26. The rails 150 and 152 include low friction strips, such as UHMWPE channel strips 154 and 156, fitted thereon for providing nonmarring low frictional engagement with the cartons 30. The rear of the input station defines the loading station where the roller carriers 20 individually pickup the cartons 30.

As shown in FIG. 1, a series arrangement of a manual air valve 160, filter 162 and pressure regulator 164 are coupled between an air input line 166 and tubing coupled to three solenoid valves 168, 170 and 172. The manual valve 160, the filter 162 and regulator 164 are suitably mounted in the frame member 118 within an opening in its cover for easy access by an operator while the air solenoid valves 168, 170 and 172 are mounted by a bracket 174 on a frame member 176 of the frame base 122. The output of the solenoid valve 168 is connected to a pair of air jet nozzles 180 and 182 mounted by brackets 184 and 186, FIGS. 4 and 6, below the carton supports 138 and 140 with the openings of the nozzles 180 and 182 directed upward past the outer edges of the upper portions of the supports 138 and 140 so that jets of air issuing from the nozzles 180 and 182 will impinge upon the bottom edges of end flaps of the cartons 30; see FIGS. 9 where air jets from the nozzles 180 and 182 represented by arrows 188 and 190 impinge upon bottom edges of carton end flaps 192 and 194 so as to urge the end flaps 192 and 194 outward, as shown in phantom, if the end flaps 192 and 194 are unglued. The solenoid valve 170 is connected to an air jet nozzle 196, FIGS. 1, 4 and 6, mounted on a bracket 198 which is fastened on the vertical frame member 42. The nozzle 196 is located at a station above the loading station for the cartons 30 and is directed toward the bottom edges of the front flaps of the cartons 30 as the cartons 30 pass upward past the nozzle 196; see FIG. 10 where the air jet from the nozzle 196 is represented by arrow 200 directed at front flap 202 of carton 30 for urging the front flap 202 forward away from the carton 30 as shown in phantom. The solenoid valve 172 is connected to an air jet nozzle 204 suitably mounted on the rail 28 at a station above the front flap sensing station where the nozzle 196 is located. The output of the nozzle 204 is directed parallel to the incline of the carton carriers 20 at the left end of the cartons for issuing a jet of air to push the cartons 30 on the roller carriers through a reject opening 206 formed in the outer frame cover of the elevator apparatus and into a chute (not shown) for receiving the rejected cartons. A hood 208 is mounted over the opening 206.

As illustrated in FIGS. 1 and 3, a light emitter 224 is mounted on one side of the path of the cartons 30 passing down the rollers 110 and is directed across the path to a light receiver or detector 226 mounted on the frame member 120 on the opposite side of the path so that when a predetermined number of the cartons 30 are backed up from the loading station, the light beam from emitter 224 toward the receiver 226 will be interrupted. As illustrated in FIGS. 4, 6 and 9, the sensor supports 142 and 144 are positioned to extend in a direction inclined relative to the vertical and from below to above the rear portions of the respective ends of a carton 30 in the loading station on the supports 138 and 140 in position to be picked up by the next carrier 20. A light emitter 220 is mounted in the support 144 and directed toward a light receiver or detector 222 mounted in the support 142 such that light passing from the emitter 220 is interrupted by the presence of a carton 30 in the loading station properly in position on the supports 138 and 140. The detector supports 142 and 144 have respective recesses 228 and 230 facing the carton 30 at the loading station such that a loose flap 192 or 194 under the force of the corresponding air jet 188 or 190 pivots into the corresponding recess 228 or 230. A light emitter 232 is mounted on the lower portion of the support 142 and directed across the recess 228 toward a light receiver or detector 234 which is mounted in the upper portion of the support 142 such that a loose flap 192 interrupts the light beam from the emitter 232 to the receiver 234, and a light emitter 236 is mounted in the lower portion of the support 144 and directed across the recess 230 to a light receiver or detector 238 mounted in the upper portion of the support 144 such that a loose flap 194 interrupts the beam from the emitter 236 to the receiver 238. As shown in FIGS. 4, 6 and 10, a detector support 240 mounted on the bracket 198 in front of the path of the right portion of the cartons 30 has a recess 242 for receiving a loose flap 202 opened under the force of the air jet 200 from the nozzle 196. A light emitter 224 mounted in the lower portion of the support 240 is directed across the recess 242 toward a light receiver or detector 246 mounted in the upper portion of the support 240 such that a loose flap 202 interrupts the light beam from the emitter 244 to the receiver 246. Guides 248 and 250 with suitably curved downwardly extending ends are provided on the support 240 for guiding the front edges of the cartons as well as pushing any loose flap 202 back as the carton 30 moves past the detector block 240.

Timing facilities for controlling operation of the elevator apparatus includes, as shown in FIGS. 1, 7 and 8, timing wheels 260, 262 and 264 fixed on the left end of the elevator driving shaft 34 with respective proximity sensors 266, 268 and 270 mounted by bracket 272 on the frame member 40 for extending in operative relationship adjacent the periphery of the respective wheels 260, 262 and 264. Notches 274, 276 and 278 are formed in the respective timing wheels 260, 262 and 264 for operating the sensors 266, 268 and 270. A hinged cover 280 together with a pivotal arm 282 for holding the cover 280 open are provided for the timing wheel and sensing arrangement.

Figure 11:
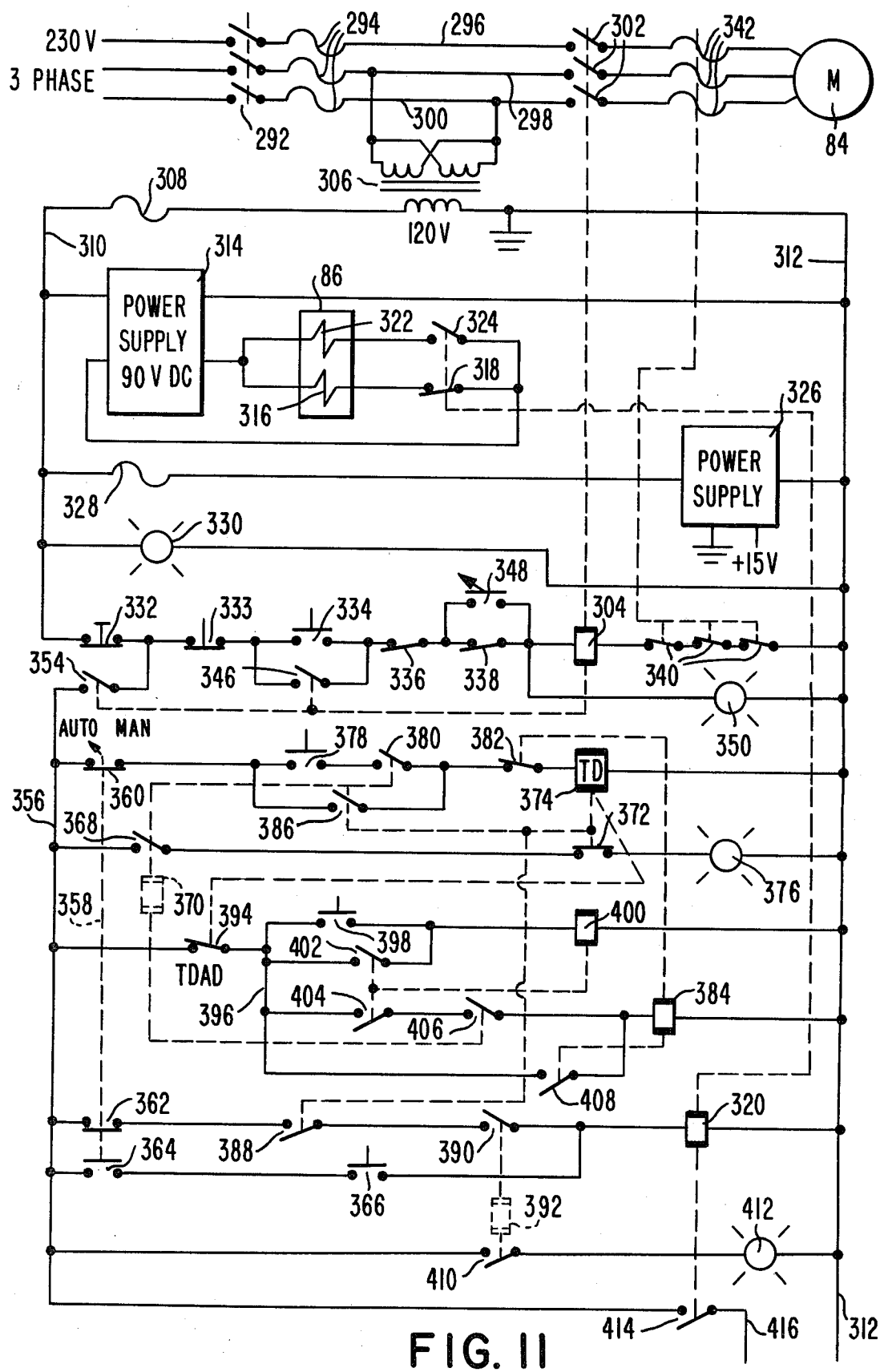
FIG. 11 is a diagram of a first portion of an electrical control circuit for operating the apparatus of FIG. 1.

Electrical control circuitry for the elevating apparatus has switches, relays, power supplies, indicator lamps, sensing circuits and various gate circuits mounted in or on an enclosure 290, FIGS. 1 and 2, in a conventional manner. As shown in FIG. 11, the circuitry includes a power switch 292 and fuses 294 for connecting lines 296, 298 and 300 to input lines from a three-phase 230 volt source. The motor 84 is connected by contacts 302 of a motor control relay 304 to the lines 296, 298 and 300. A step-down transformer 306 has its primary winding connected across the lines 298 and 300 and has its secondary connected in series with a fuse 308 to power lines 310 and 312, the line 312 being a common or grounded line. A power supply 314 for the clutch-brake mechanism 86 has its inputs coupled across the lines 310 and 312. A brake winding 316 of the clutch-brake unit 86, see FIG. 1, is connected in series with normally closed contacts 318 of a relay 320 while the clutch winding 322 of the unit 86 is connected in series with normally open contacts 324 of the relay 320. A low voltage power supply 326 has its inputs connected in series with a fuse 328 across the lines 310 and 312 for supplying 15 volt power to the low voltage components of the control circuit. A power-on indicator lamp 330 is also connected across the power lines 310 and 312 for indicating when the power is supplied to the control circuitry. The motor control relay 304 is connected in a series circuit including an emergency pushbutton switch 332, a normally closed motor stop pushbutton switch 333, a normally open motor starting pushbutton switch 334, limit switch 336, torque limiter overload sensing switch 338 and normally closed contacts 340 to motor overload protectors 342 which respond to overloads on the motor 84. The limit switch 336 as shown in FIGS. 1 and 3, is mounted so that its arm 344 is engaged by the cover bar 130 when the cover 128 is in proper position to normally hold the switch 336 closed; the switch 336 being opened when the cover 128 is removed. Normally open holding contacts 346 of the relay 304 are connected across the motor starting switch 334 for maintaining the motor 84 in operation after release of the start switch 334. A key switch 348 is coupled across the torque limiter switch 338 for bypassing the limit switch 338 during maintenance or repair procedures. A lamp 350, mounted in the motor start pushbutton switch 334, is connected across the relay winding 304 and the protector contacts 344 indicating when the motor is energized.

The emergency switch 332 is connected on one side to the power supply line 310 and on the opposite side by normally open contacts 354 of the motor relay 304 to an operating power line 356. A mode toggle switch 358 has an AUTO (automatic) position wherein contacts 360 and 362 are closed and contacts 364 are open and has a MAN (manual) position wherein the contacts 360 and 362 are open and the contacts 364 are closed. A jog normally open pushbutton switch 366 is connected in series with a contacts 364 and the clutch relay winding 320 across the power lines 356 and 312 for manually operating the elevator apparatus. Normally open contacts 368 of an interrogate relay 370 (also shown in FIG. 12) are connected in series with normally closed contacts 372 of a time delay relay 374 together with a lamp 376 across the power lines 356 and 312; the lamp 376 is located within the jog pushbutton switch 366 for indicating when the apparatus is in position for automatic starting. In the automatic mode, the contacts 360 are in series with a cycle start normally open pushbutton switch 378, normally open contacts 380 of the interrogate relay 370, normally closed contacts 382 of a stop relay 384, and the operating inputs of the time delay relay 374 across the power lines 356 and 312. The time delay relay 374 has normally open contacts 386 connected across the switch 378 and the relay contacts 380 for holding the relay 374 operated, and has normally open contacts 388 connected in series with the mode switch contacts 362, normally open contacts 390 of a clutch auto cycle relay 392 (also shown in FIG. 12) and the relay winding of the clutch control relay 320 across the power lines 356 and 312. The time delay relay 374 is such that the contacts 372, 386 and 388 operate as conventional non-time-delay contacts, i.e. the contacts 372 open and the contacts 386 and 388 close when the relay 374 is energized, and the contacts 372 close and the contacts 386 and 388 open when the relay 374 is deenergized. The time delay relay 374 also includes normally open contacts 394 which are closed after a delay after energization of the relay and are opened after a delay after deenergization; an example of a suitable delay is 0.2 seconds. The contacts 394 are connected between the power line 356 and a junction 396. An auto cycle stop normally open pushbutton switch 398 is connected in series with a stop-enable relay 400 between the junction 396 and the common power line 312. The relay 400 has normally open contacts 402 connected across the switch 398 for holding the relay 400 energized, and has normally open contacts 404 connected in series with normally open contacts 406 of the interrogate relay 370 and the winding of the stop relay 384 between the junction 396 and the common line 312. Normally open contacts of the relay 384 are connected across the contacts 404 and 406 for holding the stop relay 384 energized during the delay period after deenergization of the time delay relay 374.

The clutch auto cycle relay 392 also includes normally open contacts 410 which are connected in series with a lamp 412 across the power lines 356 and 312. Conveniently the lamp 412 is located within the auto cycle start switch 378. The clutch relay 320 also includes normally open contacts 414 which connect the operating power line 356 to a line 416 supplying power to circuitry shown in FIG. 12.

Figure 12:
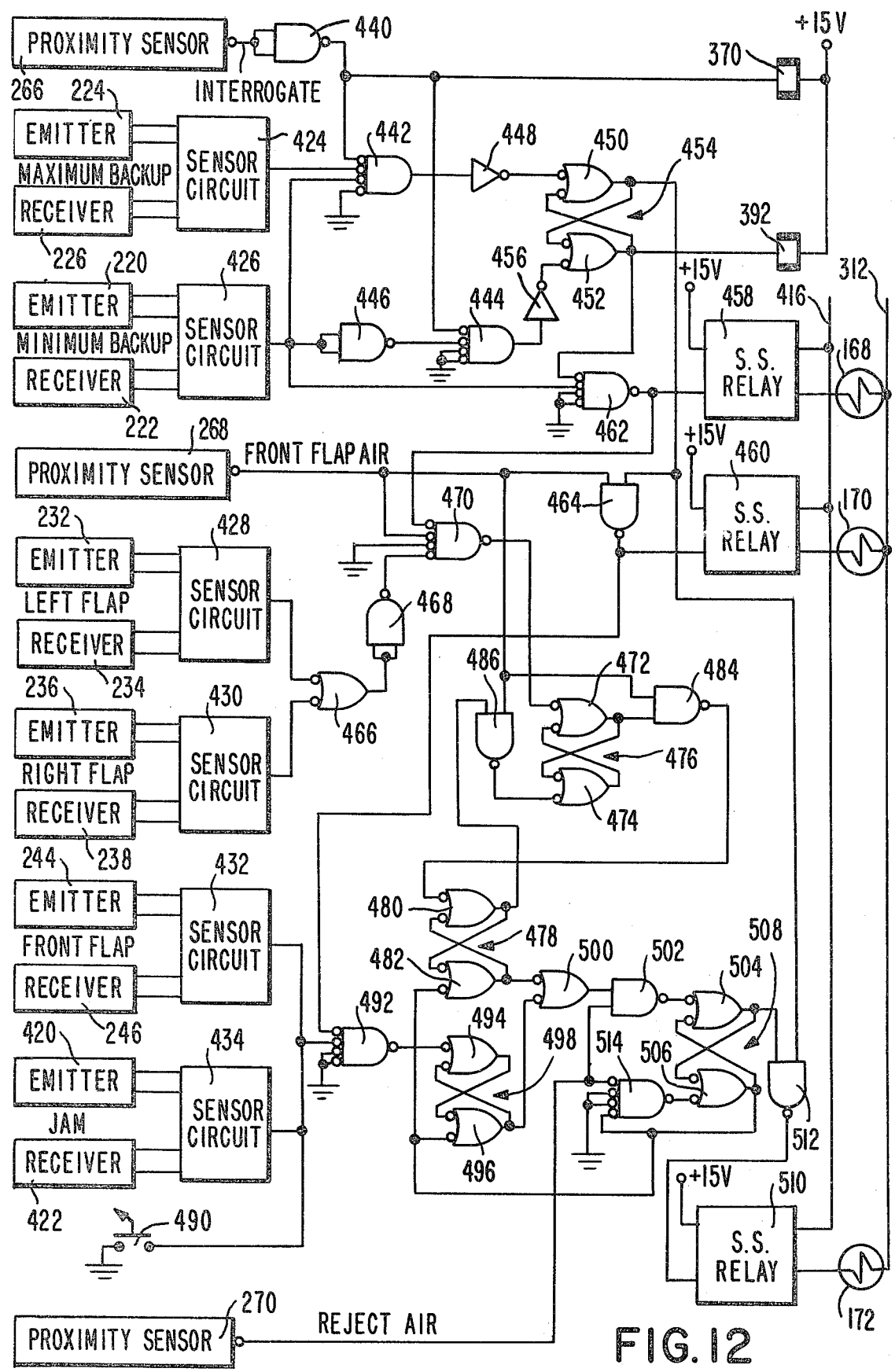
FIG. 12 is a diagram of a second portion of the electrical circuit for operating the apparatus of FIG. 1.

In the circuit of FIG. 12, there is illustrated the circuitry responding to the light receivers or detectors 222, 226, 234, 238 and 246, and the proximity sensors 266, 268 and 270 for operating the relays 370 and 392 as well as the solenoid valves 168, 170 and 172. Additionally, FIG. 12 discloses a light emitter 420 and a light receiver or detector 422 which are positioned so as to detect a jam in the output conveyor (not shown) receiving the cartons 30 from the upper end of the elevator illustrated in FIGS. 1 and 2. The various circuits and components of FIG. 12 are energized by the 15 volt power supply 326 of FIG. 11 in a conventional manner; these power supply connections not being shown in FIG. 12. Sensor circuits 424, 426, 428, 430, 432 and 434 are provided for energizing the respective light emitters 224, 220, 232, 236, 244 and 420 as well as for responding to the respective light receivers 226, 222, 234, 238, 246 and 422. The light emitters, the light receivers and the sensor circuits are all commercial units and are designed so that a positive output is produced on the illustrated output line from the respective sensor circuit when the light beam of the corresponding emitter impinges on the corresponding light receiver. The proximity sensors 266, 268 and 270 are also commerically available units which produce a focused beam of light and sense the reflection of the focused beam from a surface located at the focus point to produce a zero voltage on the outputs thereof; thus the output of the proximity sensors is high or positive when the corresponding notch 274, 276 or 278 (FIG. 8) in the timing wheels 260, 262 and 264 passes the corresponding proximity sensor 266, 268 or 270.

The spacing of the carriers 20 on the chain 22 as well as the sizes of the sprocket 32 and the timing wheels 260, 262 and 264 are selected to produce exactly one revolution of the timing wheel 260, 262 and 264 during passage of one carrier 20 through the input station.

The winding of the relay 370 is connected between the +15 volt power line and the output of a AND-NOT gate 440 which has both of its inputs connected to the output of the proximity sensor 266. The output of the gate 440 is also connected to first inputs of NAND gates 442 and 444. Second and third inputs of the NAND gate 442 are connected to the outputs of the respective sensor circuits 424 and 426 while a second input of the NAND gate 444 is connected to the output of a AND-NOT gate 446 which has both of its inputs connected to the output of the sensor circuit 426. The other inputs of the gates 442 and 444 are connected to the ground or low reference voltage. The output of the gate 442 is connected by an inverter 448 to one input of a NOR gate 450 which is interconnected with a NOR gate 452 to form a flip-flop or bistable multivibrator circuit indicated generally at 454. The output of the gate 444 is connected by an inverter 456 to an input of the NOR gate 452. The winding of the clutch auto cycle relay 392 is connected between the +15 volt source line and the output of the gate 452 in the flip-flop 454.

The windings of the side flap solenoid valve 168 and the front flap solenoid valve 170 are connected in series with operating outputs of respective solid state relays 458 and 460. The operating input of the solid state relay 458 is connected to the output of a NOT-AND-NOT gate 462 which has one input connected to the output of the NOR gate 452 of the flip-flop 454 and has a second input connected to the output of the sensor circuit 426; the other inputs of the gate 462 being connected to ground. The operating input of the solid state relay 460 is connected to the output of an AND-NOT gate 464 which has one input connected to the output of the NOR gate 450 of the flip-flop 454 and the output of the proximity sensor 268.

In the remaining circuitry of FIG. 12 for operating the reject air solenoid valve 172, the outputs of the sensor circuits 428 and 430 for detecting unglued side flaps of the carton are connected to respective inputs of a NOR gate 466 which has its output connected to both inputs of an AND-NOT gate 468. A NOT-AND-NOT gate 470 has one input connected to the output of the gate 468, has a second input connected to the output of the gate 462, has a third input connected to the output of the proximity sensor 268 and has its fourth input connected to ground. The output of the gate 470 is connected to one input of a NOR gate 472 which is interconnected with a NOR gate 474 to form a flip-flop or bistable multivibrator indicated generally at 476. A second flip-flop or bistable multivibrator circuit indicated generally at 478 is formed by interconnected NOR gates 480 and 482 with one input of the NOR gate 480 being connected to the output of an AND-NOT gate 484 which has one input connected to the output of the proximity sensor 268 and its other input connected to the output of the NOR gate 472 of the first flip-flop 476. For resetting the flip-flop 476, AND-NOT gate 486 has one input connected to the output of the proximity sensor 268, has a second input connected to the output of the NOR gate 480 of the flip-flop 478 and has its output connected to a second input of the NOR gate 474 of the flip-flop 476. A side eject toggle switch 490 is connected on one side to ground or zero reference and has its other side connected together with the outputs of sensor circuits 432 and 434 to one input of a NOT-AND-NOT gate 492 which has its output connected to one input of a NOR gate 494 interconnected with a NOR gate 496 so as to form a flipflop or bistable multivibrator circuit indicated generally at 498. The outputs of NOR gate 482 and 496 of the respective flip-flops 478 and 498 are connected to inputs of a NOR gate 500. AND-NOT gate 502 has one input connected to the output of the NOR gate 500 and has its second input connected to the output of the proximity sensor 270. The output of the gate 502 is coupled to one input of a NOR gate 504 which is interconnected with a NOR gate 506 to form a flip-flop or bistable multivibrator circuit indicated generally at 508. The winding of the solenoid valve 172 is connected in series with the outputs of a solid state relay 510 which has an operating input connected to the output of an AND-NOT gate 512 having inputs connected to the outputs of the NOR gates 450 and 504 of the respective flip-flops 454 and 508. The output of the NOR gate 506 of the flip-flop 508 is connected to inputs of the NOR gates 482 and 496 of the respective flip-flops 478 and 498 for resetting these flip-flops. For resetting the flip-flop 508, a NOT-AND-NOT gate 514 has one input connected to the output of the proximity sensor 270, has a second input connected to the output of the NOR gate 506 of the flip-flop 508, has its other inputs connected to ground, and has its output connected to an input of the NOR gate 506 of the flip-flop 508.

In operation of the apparatus for elevating articles and for detecting unglued flaps on cartons, the cover 128, FIGS. 1 and 3, must be initially in place to engage the bar 130 with the switch arm 344 to close the switch 336. With the power switch 292 closed and the emergency switch 332 in the ON position, the motor start switch 333 is depressed energizing the relay 304 which in turn closes contacts 302 to operate the motor 84. The lamp 350 in the switch 334 lights up indicating that the motor 84 is energized. Operation of the relay 304 closes contacts 346 establishing a holding circuit for the relay 304 so that subsequent release of the pushbutton 334 does not deenergize the motor relay 304. With the relay 304 energized, contacts 354 are closed energizing the power line 356.

With the mode switch 358 in the MAN position, the jog switch 366 can be depressed by an operator to energize the clutch relay 320; release of the switch 366 results in deenergization of the relay 320. When the relay 320 is deenergized, the contacts 318 are closed which energizes the brake winding 316 of the clutch-brake unit 86, see FIG. 1. When the brake is energized, the drive for the elevator is stopped. Upon energization of the relay 320 contacts 318 open and contacts 324 close deenergizing the brake winding 316 and energizing the clutch winding 322. This couples the motor 84 through the clutch mechanism 86, speed reducer 84, sprocket 96 (FIG. 7), chain 94, sprocket 98, torque limitor 100, drive shaft 34 and sprocket 32 to the chain 22 and its carriers such that the carriers 20 facing frontward are moved in an upward direction. The rotation of the shaft 34 also rotates the timing wheels 260, 262 and 264. When the cutout or notch 274 in the timing disk 260 passes the proximity sensor 266, see FIGS. 7 and 8, the output of the proximity sensor 266 goes high which causes the AND-NOT gate 440, FIG. 12, to operate the relay 370. Contacts 368, FIG. 11, of the relay 370 close to energize the lamp 376 in the jog pushbutton switch 366 indicating that the elevator apparatus is in position for automatic start. Since the jog button must be held closed by an operator, it is mainly used for checkout and maintenance purposes as well as for positioning the apparatus for automatic operation.

With the apparatus positioned for starting automatic operation as indicated by the energized lamp 376 in the jog pushbutton switch 366, the mode switch 358 may be changed to the AUTO mode and the auto cycle start push-button switch 378 can be temporarily closed to complete a circuit through the closed contacts 380 of the energized relay 370 and the normally closed contacts 382 of the deenergized stop relay 384 to energize the time delay relay 374. Contacts 386 of the relay 374 close holding the relay 374 operated after release of the button 378. Also contacts 388 of the time delay relay 374 close which permits operation of the clutch relay 320 by means of the contacts 390 of the relay 392.

When a carton 30 is in a loading position interrupting the light beam from the light emitter 220, FIGS. 4 and 6, to the light receiver 222 and when the cartons are backed up sufficiently in the input station 24 so as to block light passing from the light emitter 224, FIGS. 1 and 3, to the light receiver 226, the sensor circuits 424 and 426 both produce zero outputs which are applied to the NOT-AND gate 442. Thus when the proximity sensor 266 produces a positive voltage upon passage of the timing notch 274 therepast, the zero output from the AND-NOT gate 440 applied to the NOT-AND gate 442 produces a positive output which is inverted by the inverter 448 to set the flip-flop 454 with the output of the NOR gate 450 high. The NOR gate 452 is thus low which operates the relay 392. With the relay 392 operated, the contacts 390, FIG. 11, are closed and the clutch control relay 320 is operated to result in the advancement of the chain 22 and the carriers 20. Referring back to FIG. 12, it is noted that should the light beam between the emitter 220 and 222 be not interrupted during an interrogate signal from the proximity sensor 266, the inputs of the NOT-AND gate 444 will all be low resulting in its output being applied through inverter 456 to the NOR gate 452 to reset the flip-flop 454 which causes the output of NOR gate 452 to go high deenergizing the relay 392. Thus the elevator mechanism will be stopped by the deenergization of the clutch winding 322 and reenergization of the brake winding 316 until cartons are again present at the loading station as well as being backed up past the emitter 224 and receiver 226.

As shown in FIGS. 1 and 3, the cigarette cartons 30 are fed into the input station 24 with the backside of the cartons first and the ends of the cartons being carried by the series of roller assemblies 110 and 112. The cartons 30 move under the force of gravity down the roller assemblies 110 and 112 until the back of the carton rests against the rails 150 and 152, FIG. 4, and the ends of the cartons 30 rest upon the supports 138 and 140 after sliding from the lower ends of the roller assemblies 110 and 112.

When a carton 30 is detected by the sensor circuit 426 and when the output of the NOR gate 452 is low operating the clutch for the apparatus, the gate 462 operates the relay 458 which in turn operates the solenoid valve 168 to supply air to nozzles 138 and 140, FIGS. 1, 4 and 6. As shown in FIG. 9, air jets 188 and 190 from the nozzles will cause any unglued side flap 192 or 194 to bend outward and interrupt the light beam passing from the corresponding emitter 232 or 236 to the receiver 234 or 238. As shown in FIG. 12, the sensing of an unglued side flap operates one of the sensor circuits 428 and 430 to apply a signal through gates 466, 468 and 470 to the flip-flop 476 causing the output of the NOR gate 472 to go high. The gate 470 prevents the signal being applied to the flip-flop 476 when a carton is not present between the emitter 220 and receiver 222, when the clutch is not operated or when a front flap air signal is present from the output of the proximity sensor 268. The flip-flop 476 serves as a memory to temporarily store the condition of the side flaps of the carton being loaded onto the elevator.

Upward movement of a carrier 20, FIGS. 4 and 6, through the loading station results in the carriers 20 lifting the carton 30 from the supports 138 and 140 and carrying the carton 30 upward. The cartons during the lifting are inclined downwardly to the left as shown in FIG. 6 so that the force of gravity rolls the cartons 30 downward to the left on the roller assemblies of the carriers 20 to engage the left edge of the cartons 30 against the slide rail 28 during the upward movement of the carton. This sliding contact against the rail 28 opposes the gravity force and keeps the cartons 30 on the carriers 20.

As the cartons 30 pass the air nozzle 196 and the sensing support block 240, the notch or cutout 276 in the timing disk 262, FIGS. 7 and 8, passes the proximity sensor 268 to operate the gate 464, FIG. 12, and relay 460 energizing the solenoid valve 170 to produce an air jet 200, FIG. 10, urging any unglued front flap 202 to bend forward and interrupt the light beam from the emitter 244 to the receiver 246. Any detected loose front flap operates the sensor circuit 432, FIG. 2, to produce a signal which during the front flap air signal from the gate 464 operates the flip-flop 498 to cause the output of the NOR gate 494 to go high. Also during the front flap air signal from the proximity sensor 286, any loose side flap signal stored in the flip-flop 476 is applied by the gate 484 to the flip-flop 478. After transfer of a signal from the flip-flop 476 to the flip-flop 478, the output of the NOR gate 480 goes high which causes the gate 486, during the front flap air signal from the sensor 268 to reset the flip-flop 476. It is noted that any jam detected by the sensor circuit 434 from the emitter 420, or the side eject switch 490 being closed, also results in the output of the NOR gate 494 in the flip-flop 498 being set high.

As the cartons 30 proceed upward, they pass the reject air nozzle 204, FIGS. 1, 4 and 6, simultaneously with the cutout 278 of the timing disk 264, FIGS. 7 and 8, passing the proximity sensor 270. The output of the proximity sensor 270 goes high which enables gate 502, FIG. 12, to transfer any signals stored in the flip-flops 478 and 498, corresponding to an unglued flap, a jam or the side eject switch 490 being closed, to the NOR gate 504 of the flip-flop 508 causing the output of the NOR gate 504 to go high. This, when the clutch flip-flop 454 is in the clutch operating condition, operates relay 510 to energize the solenoid valve 172 and produce a jet of air from the nozzle 204 to blow the carton 30 from the roller carrier 20 to the right as viewed in FIG. 6 through the side eject opening 206. During the reject air, the low output of NOR gate 506 is applied to NOR gates 482 and 496 to reset the flip-flops 478 and 498. When the output of the proximity sensor 270 returns to its low state after the passing of the notch 278 past the proximity sensor 270, the gate 514 applies a low to NOR gate 506 to reset the flip-flop 508 and thus terminate the operation of the relay 510 and the solenoid valve 172 to terminate the reject air stream from the nozzle 204.

Cartons 30, which are not ejected at the side ejecting station, continue upward to the discharge station 26, FIGS. 1 and 2 at the top of the elevator apparatus. As the cartons 30 slide past the upper terminal point of the rail 28, the cartons 30 are moved by the force of gravity down the inclined rollers of the carriers 20 and onto the overhead conveying system (not shown).

The disclosed elevator apparatus employing the inclined roller carrier assemblies 20 together with the rail 28 holding the articles on the carriers during upward movement and forming a discharge station at its upper termination point, results in a substantially efficient and reliable elevator apparatus for articles. No separate discharge mechanisms are necessary for unloading the articles from the upward moving carriers. Additionally, the provision of integrated testing facilities at the loading station and during upward movement on the elevator apparatus eliminates separate relatively expensive indexing and conveying mechanism for moving the articles horizontally to various stations so that they may be tested.

In an alternative embodiment, the elevator apparatus is modified to discharge articles at the reject station to the left, and at the top discharge station to the right. In this alternative embodiment, the incline of the roller assemblies 20 is downward toward the right, the rail 28 and the nozzle 204 are positioned on the right and the reject discharge opening 206 and hood 208 are positioned on the left.

Since many variations, modifications and changes in detail may be made to the embodiment described above, it is intended that all matter in the foregoing description and shown in the accompanying drawings be interpreted as illustrative and not in a limiting sense.

What is claimed is:

1. An article elevating apparatus comprising
   a plurality of roller carrier sections,
   means for moving the plurality of roller carrier sections sequentially in an endless path including a vertical path portion,
   said moving means including means for holding said roller carrier sections at an incline relative to the horizontal in said vertical path portion,
   means at a one end of the vertical path portion for feeding articles sequentially to the roller carrier sections,
   a guide rail extending vertically alongside the vertical path portion on the downward side of the roller sections for maintaining the articles on the roller carrier sections while moving in the vertical path portion, and
   said guide rail having a termination point at the opposite end of the vertical path portion so as to define a gravity discharge station where articles carried by the roller carrier sections are discharged by passing the guide rail.

2. An apparatus as claimed in claim 1 wherein said moving means includes
   an endless chain,
   means for driving the chain in a vertically elongated loop,
   a plurality of rectangular plates mounted in spaced relationship with each other on the chain corresponding to the plurality of roller carrier sections,
   means mounting the roller carrier sections on the respective rectangular plates, and
   a pair of vertical channel guides for engaging and guiding the side edges of the rectangular plates while the roller carrier sections are moving in the vertical path portion.

3. An apparatus as claimed in claims 1 or 2 including means for sensing a defective condition of the article at the one end of the vertical path portion, and means including air jet means positioned alongside the vertical path portion on the downward side of the roller sections for blowing rejected articles from the roller carrier sections in a direction inclined upward along the roller carrier sections.

4. An apparatus as claimed in claim 3 wherein the articles are cartons having side flaps, and wherein the detecting means includes means for detecting an unglued side flap on a carton.

5. An apparatus as claimed in claim 4 wherein the cartons also have front flaps, the means for feeding the cartons sequentially to the roller carrier sections defines a loading station for the roller carrier sections, the means for detecting an unglued side flap is positioned at the loading station, and the means for detecting a defective condition also includes means positioned at a station above the loading station for detecting an unglued front flap on a carton, said reject nozzle being positioned higher than the unglued front flap detector means.

6. An apparatus as claimed in claim 5 wherein the moving means includes a drive shaft, and wherein there is included a plurality of timing wheels mounted on the drive shaft, and a plurality of sensors responding to the corresponding timing wheels for controlling operation of the apparatus.

7. An apparatus as claimed in claim 6 including memory means responding to the means for detecting an unglued flap for operating the reject mechanism.

8. An apparatus as claimed in claim 1 or 2 wherein the articles are elongated horizontal cartons, and the means for feeding articles sequentially to the roller carrier sections includes means defining a downwardly inclined input path terminating at a loading station which is at said one end of the vertical path portion of the roller carrier sections, said means for moving the plurality of roller carrier sections also being for advancing the roller carrier sections upward through the loading station, roller conveyor sections mounted on said path defining means beneath opposite edges of the input path for guiding ends of the elongated cartons, and a pair of rear guide rails for engaging the rear edge of a leading carton advancing down the roller conveyor sections over the path of the upward moving roller carrier sections.

9. An apparatus as claimed in claim 8 including
   first detector means for detecting an article at the loading station,
   second detector means for detecting articles backed up a distance along the input path from the loading station,
   first control means for starting operation of the elevator apparatus when both said detector means detect the presence of articles, and
   second control means responsive to the first detector means sensing an absence of an article for stopping the operation of the elevating apparatus.

* * * * *